(12) United States Patent
Kooijman et al.

(10) Patent No.: US 8,215,896 B2
(45) Date of Patent: Jul. 10, 2012

(54) APPARATUS AND METHOD FOR OPERATION OF AN OFF-SHORE WIND TURBINE

(75) Inventors: Henk-Jan Kooijman, Enschede (NL); Axel Braicks, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/973,315

(22) Filed: Dec. 20, 2010

(65) Prior Publication Data
US 2011/0211951 A1    Sep. 1, 2011

(51) Int. Cl.
F03D 7/00 (2006.01)
F03D 11/00 (2006.01)
(52) U.S. Cl. .............................. 415/1; 415/15; 415/118
(58) Field of Classification Search ............ 415/1, 3.1, 415/15, 24, 118; 416/DIG. 4, DIG. 6
See application file for complete search history.

(56) References Cited

U.S. PATENT DOCUMENTS

| 8,022,566 B2* | 9/2011 | Loh et al. ................... 290/44 |
| 2008/0118342 A1 | 5/2008 | Seidel et al. |
| 2008/0260514 A1* | 10/2008 | Nielsen et al. ............... 415/4.3 |
| 2009/0263245 A1* | 10/2009 | Shi et al. ................... 416/43 |

FOREIGN PATENT DOCUMENTS
DE    102006054666 B4    1/2010
* cited by examiner

Primary Examiner — Nathaniel Wiehe
(74) Attorney, Agent, or Firm — Global Patent Operation; Douglas D. Zhang

(57) ABSTRACT

A method for operating an off-shore wind turbine and a wind-turbine is provided. The off-shore wind turbine is at least temporarily situated in water and includes a rotor with at least one rotor blade and a pitch drive system coupled to the at least one rotor blade. The pitch drive system is adapted for pitching the at least one rotor blade, wherein the wind turbine further includes a wind turbine control. The method includes determining at least one of a water condition; in dependence of the outcome of the determining, defining peak shaver settings; and pitching the at least one rotor blade according to the peak shaver settings. Furthermore, the wind turbine has a sensor adapted for measuring one of the water current-speed, the water current direction and the water level at or close to the wind turbine.

18 Claims, 8 Drawing Sheets

APPARATUS AND METHOD FOR OPERATION OF AN OFF-SHORE WIND TURBINE

BACKGROUND OF THE INVENTION

The subject matter described herein relates generally to methods and systems for operating an off-shore wind turbine, and more particularly, to methods and systems for operating a control for an off-shore wind turbine.

Generally, a wind turbine includes a turbine that has a rotor that includes a rotatable hub assembly having multiple blades. The blades transform wind energy into a mechanical rotational torque that drives one or more generators via the rotor. The generators may be rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electrical power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines are typically designed and/or assembled with pre-defined rated power limits. To operate within such rated power limits, the electrical and/or mechanical components may be operated with large margins for the operating limitations. Such operation may result in inefficient wind turbine operation, and the power generation capability of the wind turbine may be underutilized.

Typical wind turbines are operated by a wind turbine control which particularly implements pitch control by rotation of the rotor blades about a pitch axis. That is, these control systems are designed for regulating the rotor speed of the wind turbine by setting the angles of the blades, i.e., pitching the blades, with respect to the airflow. Pitching the blades for decreasing the rotor speed generally results in a decrease of the load acting on some of the components of the wind turbine, such as the blades, the rotor, or the wind tower.

Generally, an increase of the speed of the wind impinging on the rotor blades causes an increase of the rotor speed. Under conditions such as high winds in the area of the wind turbine, the rotor speed may eventually exceed a threshold value corresponding to the maximum allowable speed of the wind turbine (i.e., an overspeed).

At least some known control systems which implement pitch control are designed for monitoring the rotor speed by determining actual values thereof and aerodynamically decreasing the rotor speed by increasing the pitch angle of the blades as soon as the "rated speed" is reached. The rated wind speed is the minimum wind speed at hub height at which a wind turbine's rated power is achieved in the case of steady wind without turbulence. The rated wind speed and the rated power is typically a constant for a wind turbine, and wind turbine manufacturers do normally provide information thereabout.

In this situation, sudden decrease of the rotor speed by pitching the blades may result in a particularly significant increase of the load acting on components of the wind turbine. A significant load increase negatively influences the operating life of the turbine. In at least some known pitch control systems, the pitch control drives the rotor speed back to or below a certain set-point value of the wind turbine.

The increase and posterior decrease of the pitch angle generally results in alternating forces acting on the tower. In some cases, these alternating forces may excite the resonant modes of the tower and lead to a resonant vibration of the tower. Such a resonant vibration of the tower may require shutting down the wind turbine when the vibration exceeds a maximum allowable limit. A shutdown event generally implies a loss of the capacity for generating power by the wind turbine.

Offshore wind turbines are additionally exposed to water conditions impacting the base of the wind turbine. The water conditions can provide additional constant load and may also stimulate the system in a resonance frequency. Undesired oscillations can result. This may lead to damage to or premature aging of the wind turbine.

Accordingly, it is desirable to provide a method and a wind turbine capable of implementing a wind turbine control which avoids high load on the wind turbine components and diminishes the risk of a shutdown of the wind turbine due to an overload state or fatigue of the wind turbine.

BRIEF DESCRIPTION OF THE INVENTION

In one aspect, a method for operating an off-shore wind turbine is provided. The off-shore wind turbine is at least temporarily situated in water and includes a rotor with at least one rotor blade and a pitch drive system coupled to the at least one rotor blade. The pitch drive system is adapted for pitching the at least one rotor blade, wherein the wind turbine further includes a wind turbine control. The method includes determining at least one of a water condition; defining peak shaver settings dependent on the at least one water condition; and pitching the at least one rotor blade according to the peak shaver settings.

In another aspect, a method for operating an off-shore wind turbine is provided. The wind turbine is at least temporarily situated in water and includes a rotor including at least one rotor blade and a pitch drive system coupled to the at least one rotor blade. The pitch drive system is adapted for pitching the at least one rotor blade. The method includes determining at least one of the water current speed, the water current direction and the water level at or close to the wind turbine; and controlling the wind turbine dependent on said at least one of the water current speed, the water current direction and the water level.

In yet another aspect, an off-shore wind turbine is provided. The off-shore wind turbine is situated in water and includes a rotor with at least one rotor blade; a pitch drive system coupled to the at least one rotor blade; and a sensor adapted for measuring one of the water current speed, the water current direction and the water level at or close to the wind turbine. The pitch drive system is adapted for pitching the at least one rotor blade. The off-shore wind turbine further includes a wind turbine control for controlling the wind turbine. The wind turbine control controls the pitch drive system in dependence of the sensor results.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine and a method for operation of a wind turbine that reduces or avoids undesired load and oscillations of the wind turbine. Thereby, the wind turbine is prevented from becoming damaged or aging prematurely.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. The term "wind turbine" may be used synonymously with the term "wind turbine system". It includes the support structure of the wind turbine, such as the tower or the foundation, as well as the nacelle, hub and the rotor. In particular, as understood herein the term "wind turbine" includes that part of the wind turbine which is positioned below the water surface. The term "wind turbine control" refers to any device controlling at least one operation of the wind turbine. The term is used synonymously to "turbine controller" or "control system". As used herein, the term "wind turbine control" particularly includes the pitch control of the rotor blades.

Figure 1:
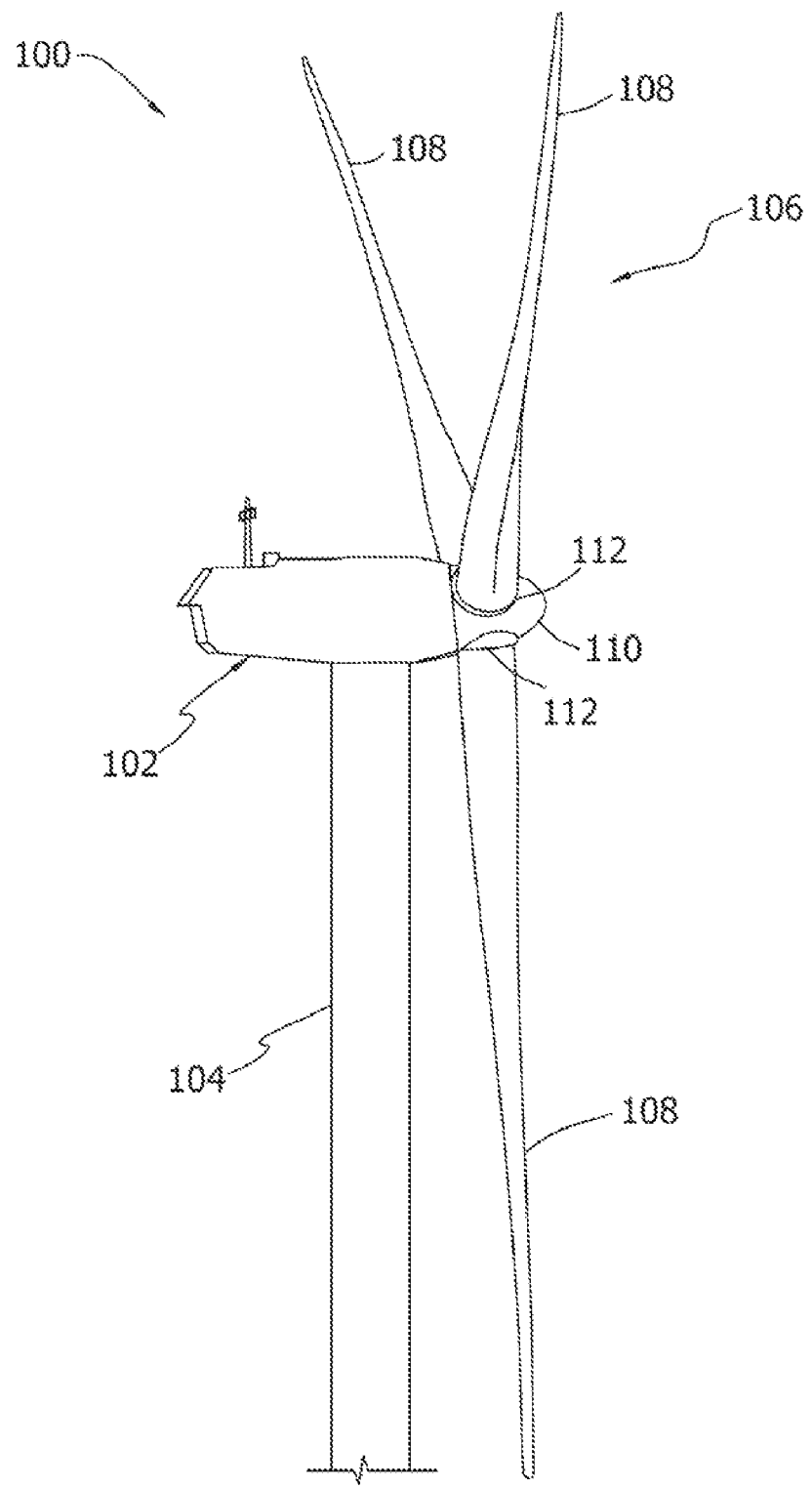
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. According to aspects described herein, the rotor blades are pitched by a pitch drive system 112. The pitch drive system is typically inside the hub and/or rotor blade. In the exemplary embodiment, wind turbine 100 includes a gearbox (not shown in FIG. 1) operatively coupled to rotor 106 and a generator (not shown in FIG. 1).

Figure 2:
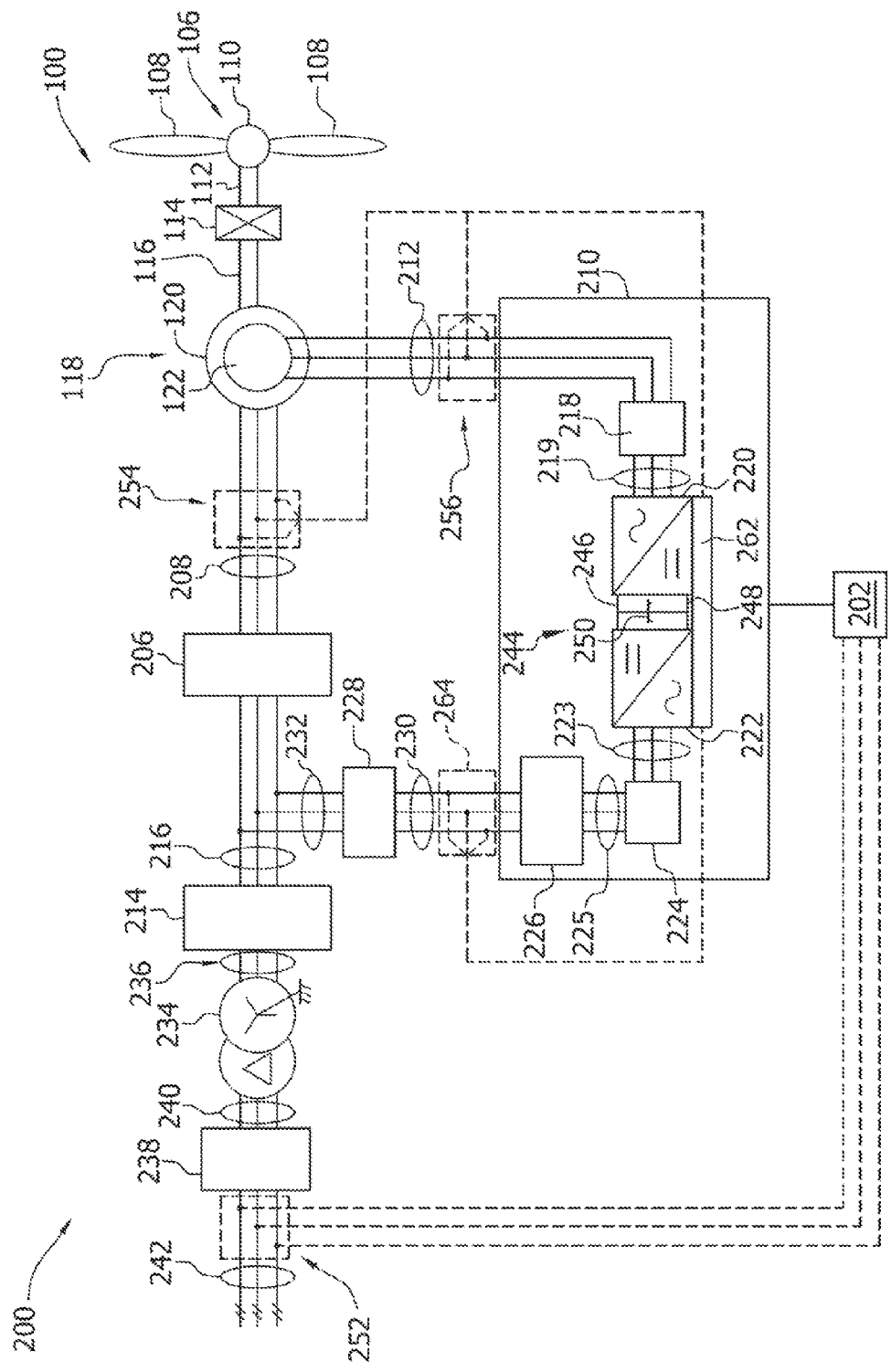
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
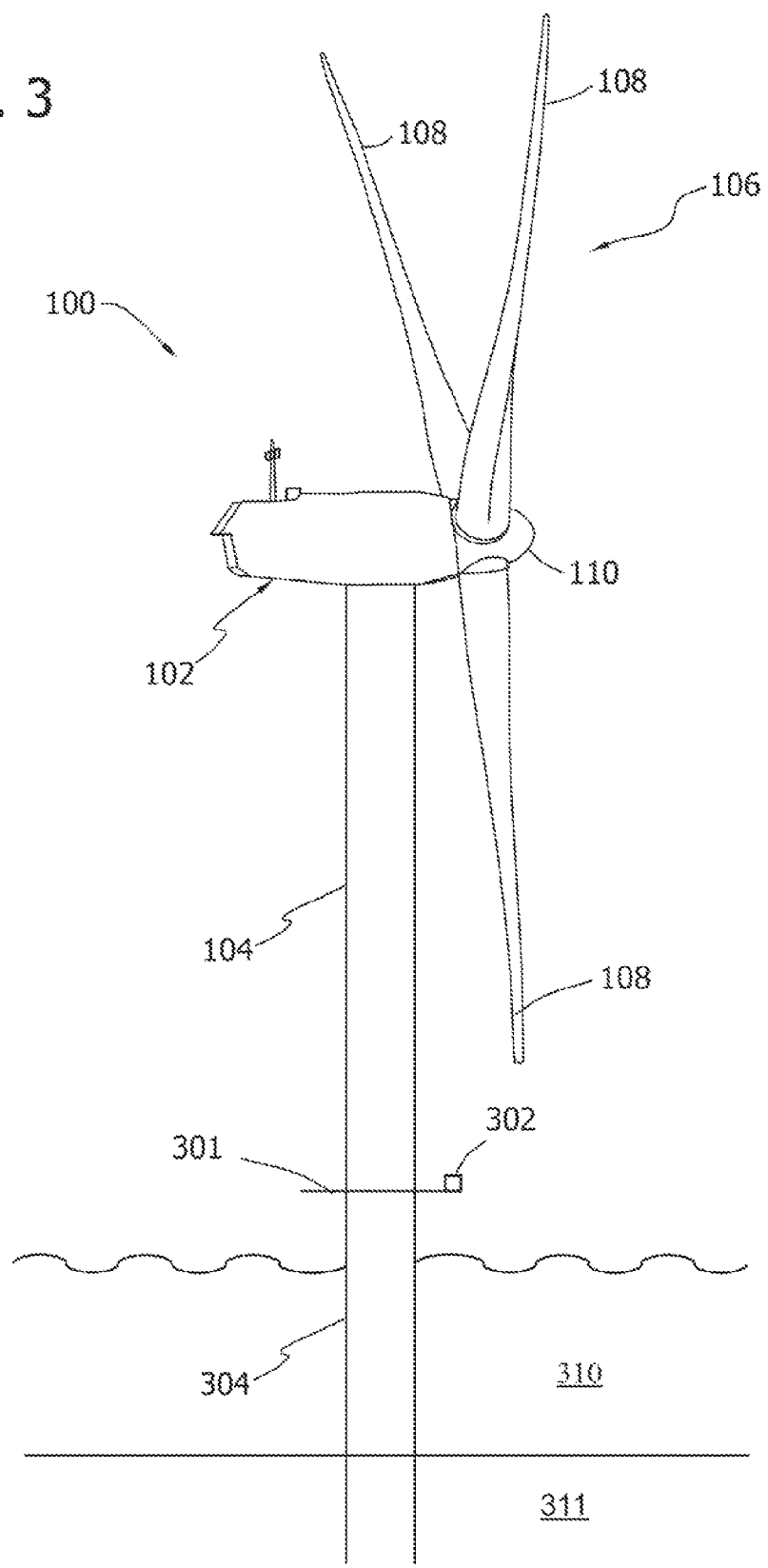
FIG. 3 is a perspective view of an exemplary off-shore wind turbine.

FIG. 3 shows an exemplary off-shore wind turbine according to embodiments described herein. The off-shore wind turbine is at least temporarily situated in water. The figures shown herein are schematic. In addition to what is shown in FIG. 1, FIG. 3 illustrates a boat landing platform 301 and a sensor 302. The turbine is situated in the water 310. A typical off-shore wind turbine is fixed to the ground 311 such as the sea ground. For instance, the wind turbine, i.e. its tower, might have been rammed into the ground during erection. The part of the wind turbine tower which is below the water level shall be called "under-water tower", and is referenced to by reference number 304 in FIG. 3. According to other embodiments not shown in FIG. 3, there is an additional foundation.

Herein, the term "support structure" may be used for the wind turbine tower, the transition piece, if any, and the foundation, if any. The foundation may extend only below the water level, or may extend above the water level. The foundation is typically the connection between the ground and the tower. The foundation may be made of concrete, steel, or a combination thereof.

According to embodiments, which can be combined with other embodiments herein, the sensor as described is adapted for measuring the water current, in particular the water current speed or the water current direction or both of them. The term "water current" shall refer to the directed movement of water which is typically generated by the forces acting upon this mean flow, such as breaking waves, wind, Coriolis force, temperature and salinity differences and tides caused by the gravitational pull of the moon and the sun. Also, depth contours, shoreline configurations and interaction with other currents may have an impact on the direction and strength of a current. The description "measuring the water current" as used herein refers to measuring at least one of the water current speed and the water current direction.

Further, the sensor may be adapted to measure the actual water level. The term "water level" as understood herein shall refer to the actual height of the water above the ground. The water level may vary by some meters, in particular in dependence on the tides.

The sensor as used herein can be positioned at the wind turbine, in particular at the nacelle or at the tower, or close to the wind turbine. The sensor may be positioned above, at, or below the water level. For instance, a sensor may be used that employs an optical or sonic technique, such as a Doppler sensor. A sensor positioned at or below the water level may be, for instance, a floater capable of measuring the water level or the water current. The sensor as described is connected to the wind turbine control. The wind turbine control typically receives information from the sensor and uses this information for the control of the wind turbine. The term "close to" as used herein shall refer to a location within the same wind farm, such as, within 30 km distance or even within 10 km distance. According to some embodiments, "close to" refers to another wind turbine next to the wind turbine. Since current and water level information normally does vary only little on a local scale, according to embodiments, it is possible that only few sensors, such as between 1 and 5, are provided per wind farm. The sensors transmit their information to the individual wind turbines.

It has been considered to take the wave heights into account when controlling a wind turbine. According to these considerations, waves striking the wind turbine stimulate or excite the oscillation of the tower.

This isolated approach ignores the effect of the water level or the water current on the wind turbine control. The water level is relevant since the surface of the under-water tower that is exposed to the water strongly depends on the water level. In particular in those wind turbines which are located close to the coast line, the variations in the water level may be an essential percentage of the water level, such as of up to 50% or even more. Hence, the resulting force by the water on the tower is massively influenced by the water level. A high water level results in high forces upon the tower whereas a low water level results in lower forces upon the tower.

What has been further ignored so far is the water current, in particular the water current speed. This might be due to the fact that the water current was believed to cause a constant force acting on the tower, the resulting force of which can be ignored because it is constant. However, it turns out that the current has a substantial influence on the tower oscillation. One reason for this will be explained in the following.

Generally, both the waves and the current interact with offshore wind turbines. When wave impinges on the support structure, at least a part of the wave momentum will be transferred to the support structure and thus onto the offshore wind turbine. Typically, water waves are a more or less periodic phenomenon. Normally, a sequence of waves each having about the same wavelength, wave speed and, therefore, momentum, impinge on the tower and can thus be envisioned as a direct periodic excitation of the tower.

The interaction between current and the wind turbine is different from the interaction between water waves and the wind turbine. The currents are typically constant on a short-time scale. However, typically, the current will cause a phenomenon known as vortex shedding. If an object, e.g. a cylinder, is placed in a laminar flow of a medium, vortices will form behind the structure, detach from it and travel with the flowing medium. These vortices are also known as the von Karman vortex street. The formation and detachment of the vortices is basically periodic. For example, the vortex shedding frequency f of a long cylinder can be approximated by $$f = 0.198 \frac{v_{current}}{d}\left(1 - \frac{19.7}{Re}\right)$$

wherein $v_{current}$ is the velocity of the current, d is the diameter of the cylinder and Re is the Reynolds number of the flow. Due to preservation of angular momentum, the rotational direction of two subsequent vortices will be opposite to each other. Following Newton's third law, each vortex transfers momentum onto the structure upon detaching from the structure. Accordingly, vortex shedding also causes periodic excitation of the wind turbine, in particular of the support structure such as the wind turbine tower.

The periodic excitation of the offshore wind turbine may have undesirable consequences due to its interaction with the water. In particular, the vortex shedding frequency of the current may be close to one of the eigenfrequencies of the tower. In this event, tower vibration will build up rapidly and may damage these structures or may even have disastrous consequences including loss of structural integrity.

Figure 4:
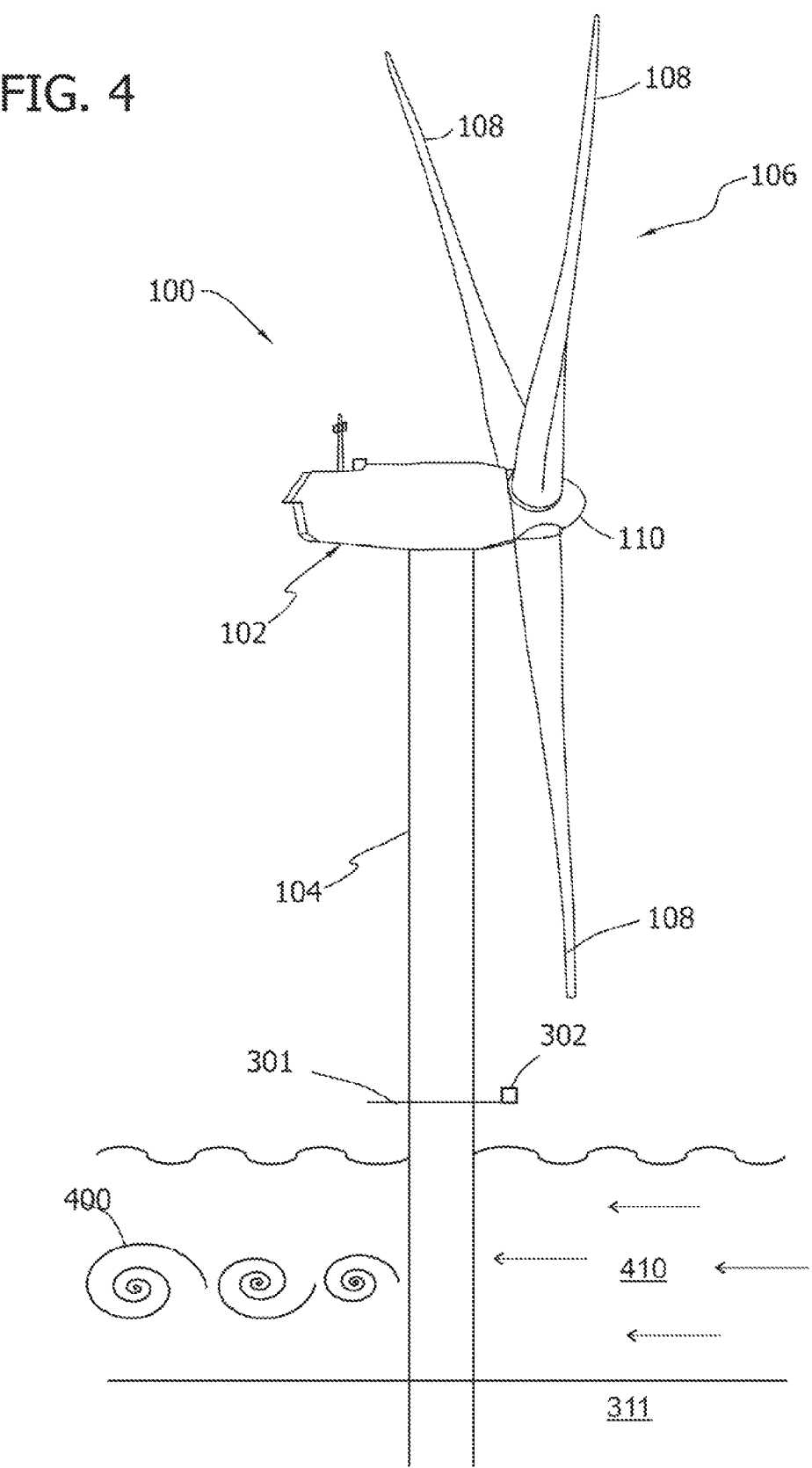
FIG. 4 is a perspective view of an exemplary off-shore wind turbine.

FIG. 4 illustrates the von Karman vortex street. In the embodiment shown, the water current direction is from right to the left and coincidentally matches the wind direction. The arrows 410 represent the water current before impinging the wind turbine. After flowing around the tower, which is normally cylindrical in shape, the vortexes 400 are formed resulting in an oscillation of the tower. The higher the water level is, the higher the resulting force upon the tower is. Also, the faster the water current is, the higher the resulting force upon the tower is. Furthermore, according to embodiments, the water current direction is considered and is typically compared to the wind direction. For instance, if the wind direction matches the water current direction, both the loads caused by the water and the wind are directed into the same direction and, thus, combine with each other. If, for example, the water current direction differs from the wind direction at 90°, the respective resulting forces stimulate or excite the support structure, in particular the tower, in orthogonal directions.

Hence, according to embodiments described herein, at least one of the water level, the water current direction, and the water current speed is measured. The measured information is used for the control of the wind turbine. In other words, based on, inter alia, this measured information, the wind turbine is controlled.

Also, according to embodiments, the amount of necessary hydrodynamic damping depends on the water level. Roughly speaking, the higher the water level is, the more damping is induced. Hence, also the water level can be important information for the control of the wind turbine.

In order to effectively keep the loading on the turbine and support structure essentially below a certain load threshold value, the rotor speed or pitch schedule may be adapted.

An example is the pitch angle regulation around rated power or wind speed, which is known as "peak shaver" or "thrust clipping". For example, low water level and low damping circumstances can be combined with strong peak shaver settings whereas high water levels with an equally favorable level of hydrodynamic damping can be combined with soft peak shaver settings.

For a maximum power capture the peak shaver settings must be as soft as possible, i.e. only releasing the blades to start pitching to feather once rated power has been reached. However, on the other hand, this operational modus also involves high load on the blades, the rotor, the drive train and the support structure such as the tower. Hence, according to an embodiment, it is desirable to avoid any such operational mode if the water conditions exert additional load on the tower such as stimulating additional oscillation.

According to embodiments, measuring the water level is undertaken together with measuring another water condition such as the water current speed or the wave height. A high water level at calm waters, for instance at a low current speed and small waves, can be beneficial for damping an oscillation of the support structure, which could be aerodynamically excited. However, at a high water current speed leading to strong vortexes, or at high water waves, a high water level could induce substantial oscillation. Hence, according to embodiments, the peak shaver settings are based on measurement results of the water level and at least one further wind condition.

In particular, in some situations, if the water level is high and/or a high current speed can be measured, it might be desirable to control the wind turbine with strong peak shaver settings. Although the energy capture might become slightly reduced in comparison to soft peak shaver settings, the resulting load, in particular on the tower, can be reduced. This way, the fatigue and the need for maintenance can be reduced.

With reference to the following figures, the term peak shaver as used herein shall be explained.

Figure 5:
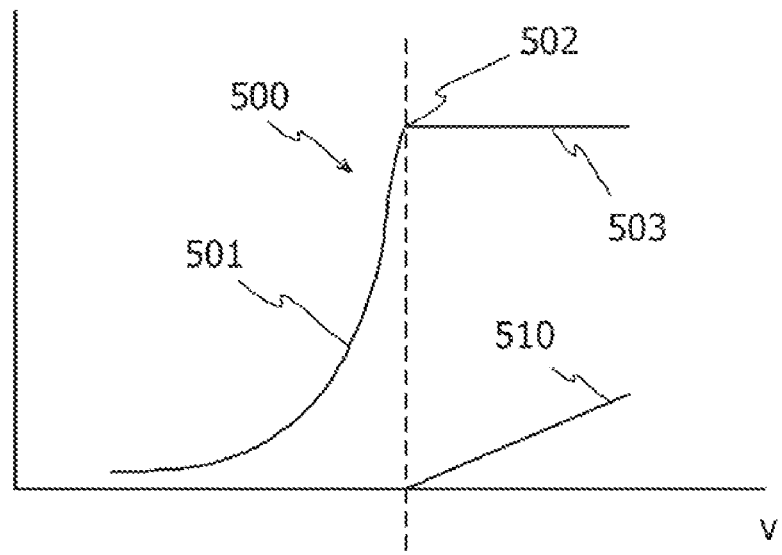
FIG. 5 is an exemplary power curve in dependence of the wind speed.

The pitch angle control of a wind turbine without peak shaver control is illustrated in FIG. 5. The power curve 500 illustrates the generated power in dependence of the wind speed v. Whereas it is not possible to generate any power at very low wind speeds, e.g. below a wind speed of, for instance, 3 m/s, the generated power increases non-linearly with increasing wind speed as illustrated by the power curve section 501. During these wind speeds, the pitch angle is kept constant at maximum angle to capture the maximum of the wind energy. At the rated wind speed, that is, when the rated power of the wind turbine is reached, such as 1.5 MW, 2.5 MW, or a higher Watt number, turbine components such as the electrical components would undergo damage if the pitch angle was kept constant and thus the full energy of the wind was to be converted into electrical energy.

Thus, at wind speeds higher than the rated wind speed, which is denoted with reference number 502 in FIG. 5, the control seeks keeping the converted power constant at the rated power. This is shown as the constant power line 503 in FIG. 3. In order to do so, the pitch angle control starts feathering the rotor blades at an increasing angle, depending on the wind speed. The line 510 represents the pitch angle and shall illustrate the increasing pitch angle at increasing wind speeds above the rated wind speed.

Figure 6:
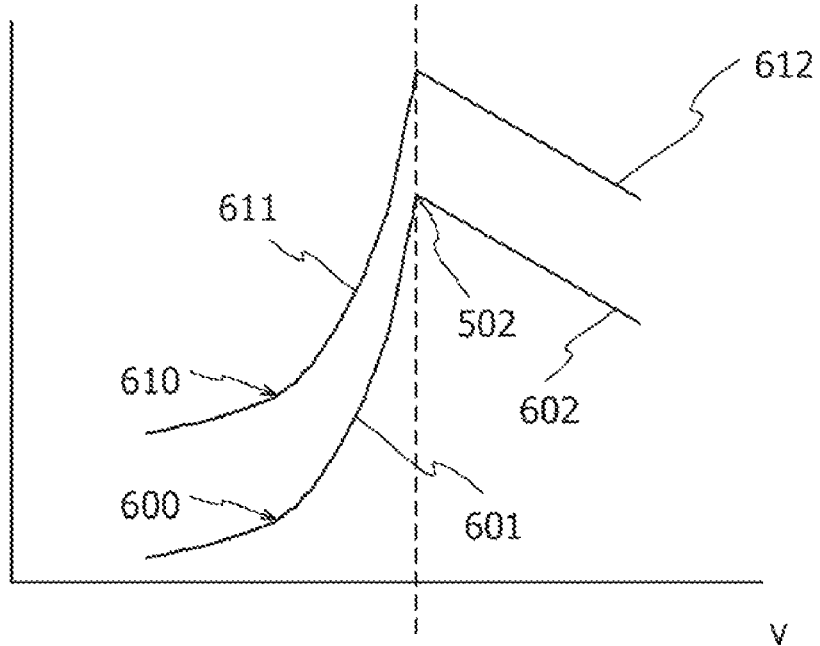
FIG. 6 is an exemplary load curve in dependence of the wind speed.

The effect of this control approach in terms of loads to the wind turbine and its components is shown in FIG. 6. Whereas the x-axis refers to the wind speed v, the y-axis illustrates the loads to the wind turbine and its components. The components of the wind turbine as used herein particularly include the support structure. Coming from small wind speeds, the load increases with increasing wind speeds. This is shown as the non-linearly increasing curve 601. When the rated power is reached, i.e. at the rated wind speed referenced to by number 502, the load has reached its maximum. That is, once pitching the blades starts, the load to the turbine and the blades is reduced.

Whereas the curve 600 is an isolated view of the loads in sole dependence of the wind speed, the curve 610 illustrates the loads under the further consideration of the water condition parameters. The schematically shown curve 610 thus illustrates the loads on the wind turbine and its components, for instance, at a high water current speed, if it was controlled as described with respect to FIG. 5, i.e., without any peak shaver. The shown curve 610 includes the power curve section 611 below the rated wind speed 502, and the power curve section 612 above the rated wind speed 502. The load due to water conditions in the illustrated example is not correlated to the wind speed.

According to the "peak shaver control", pitching starts when an operational parameter (henceforth called "peak shaver parameter") exceeds a peak shaver set-point. For instance, the peak shaver parameter can be the generated power of the turbine or the wind speed. The peak shaver parameter can also be a thrust loading indicator which indicates the overall loading at the support structure (such as by indicating the tower deflection at hub's height). The peak shaver set-point is smaller than the rated value of the peak shaver parameter, such as the rated power of the wind turbine or the rated wind speed of the turbine. Furthermore, according to embodiments, pitching is performed in a manner such that an estimated overspeed state does not occur. According to embodiments, which can be combined with other embodiments, the peak shaving settings include settings on the target pitch offset. The target pitch offset is defined as the difference of the pitch angle at the set-point of the peak shaver parameter (e.g., at a power value of 90% of the rated power) and at the rated value of the peak shaver parameter (e.g. rated power). For instance, it could be defined that the target pitch offset is at maximum 10° at specific water conditions whereas it is at maximum 5° at other water conditions.

Figure 7:
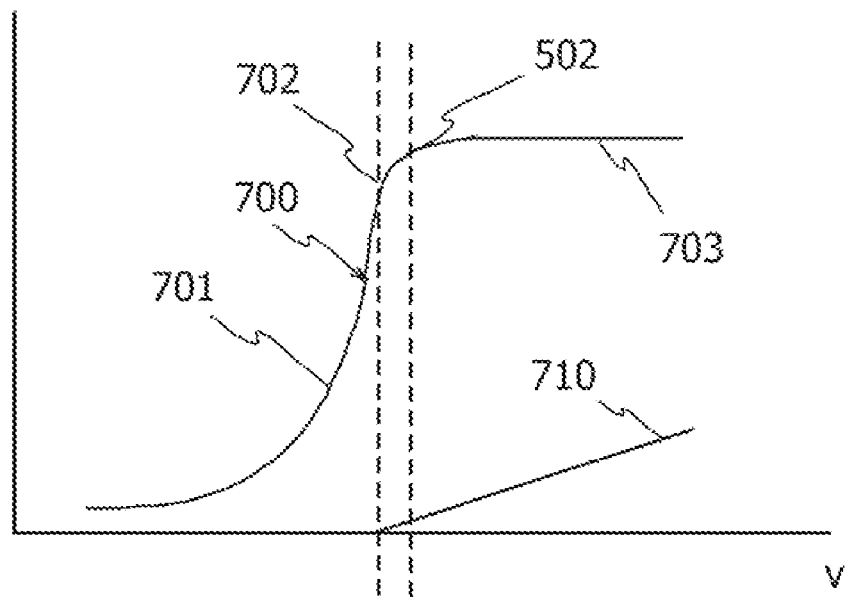
FIG. 7 is an exemplary power curve in dependence of the wind speed.
Figure 8:
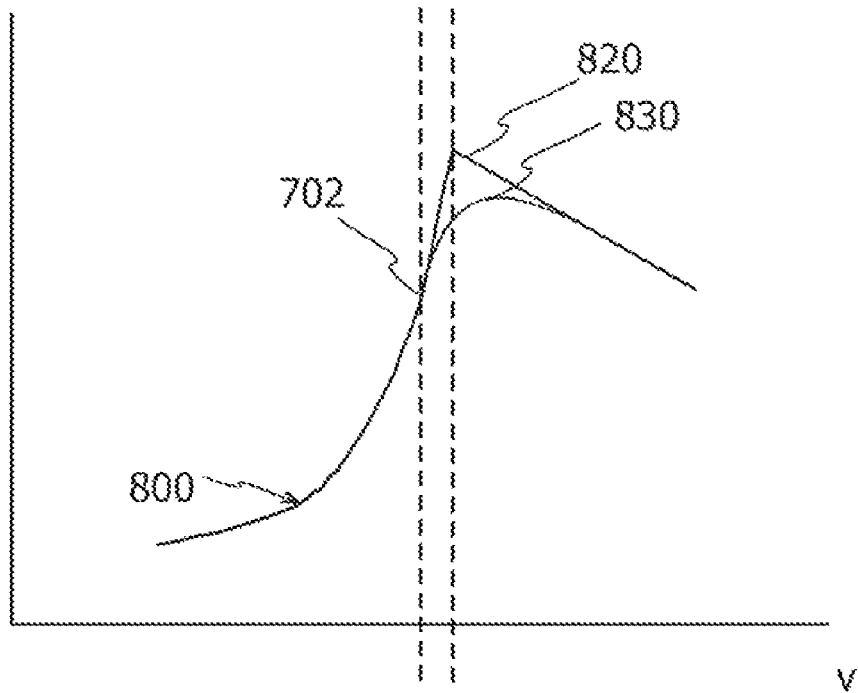
FIG. 8 is an exemplary load curve in dependence of the wind speed.

This is illustrated in FIGS. 7 and 8. According to the peak shaver control, pitching the blades starts prior to the rated wind speed 502.

Generally herein, the peak shaver set-point can be, for instance, a specific power value (called "peak shaver power" herein). For instance, it can be a power value between 80% and 98% of the rated power, more typically between 85% and 95% of the rated power. The peak shaver set-point can also be a wind speed. The wind speed at which pitching starts according to the peak shaver control shall be referred to as "peak shaver wind speed". The peak shaver wind speed is always smaller than the rated wind speed. As exemplarily shown in FIG. 7 by the line 710, pitching of the blades starts prior to the rated wind speed, namely, at the peak shaver wind speed which is referenced to by reference number 702 in FIG. 7.

Due to the start of pitching at the peak shaver set-point, i.e. the peak shaver wind speed in FIG. 7, the power curve 700 becomes flattened in the region around the rated power. That is, the energy production in this wind speed region becomes non-optimal since the turbine does not convert the full wind energy into electrical energy although the rated power is not yet reached.

This effect, however, is accepted for the following positive effect outweighing it. This positive effect is illustrated in FIG. 8 showing the loads to the wind turbine and its components. The curve 800 illustrates the overall load to the wind turbine both in case of peak shaver control and in non-peak shaver control. The overall load as understood herein shall include both the load caused by the wind and the load caused by the water, such as the water current or the water level.

With reference to FIG. 8, the peak shaver control starts at the peak shaver wind speed 702. Due to the early pitching of the rotor blades, the loads caused by the wind can be reduced so that the overall load is reduced. The curve section 820 illustrates the loads without peak shaver control. Evidently, this curve section has a high maximum at the rated wind speed as explained with respect to FIGS. 5 and 6. However, due to the peak shaver control employed according to embodiments described herein, the peak is flattened ("shaved") resulting in an overall load 830.

Figure 9:
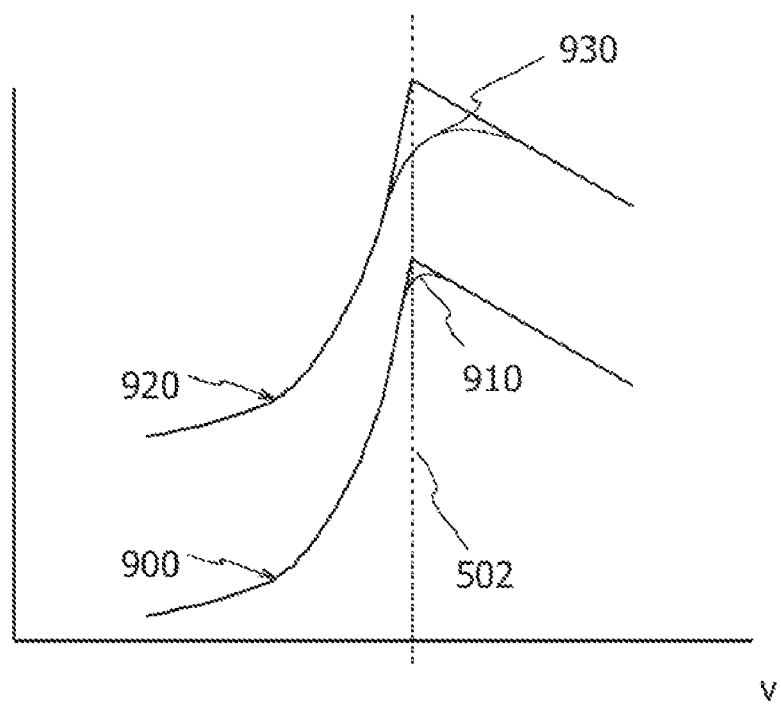
FIG. 9 shows several examples of load curves in dependence of the wind speed.

FIG. 9 illustrates the wind turbine control dependent on the actual water conditions. Roughly speaking, in bad water conditions, a comparatively low wind speed is chosen for the peak whereas in good water conditions, a comparatively high wind speed is chosen for the peak shaver. For instance, if a water condition is below a predetermined threshold value, the peak shaver set-point is chosen to be a maximum of 10%, typically a maximum of 5% below the peak shaver parameter (e.g., the generated power, the wind speed, a thrust loading parameter indicating the thrust loading to the support structure, or a cumulative fatigue loading indicator). If the water condition is above the predetermined threshold value, the peak shaver set-point is chosen to be at least 5%, typically at least 10% below the relevant peak shaver parameter such as the power or the wind speed. Alternatively, the water condition can particularly be one or more of the water current speed, water direction, and water level. Each water condition of interest may have at least one threshold value. It is also possible to have several threshold values per water condition. Exceeding each threshold value would amend the peak shaver set-point value. By this control it is possible to avoid high load peaks, independent of the actual water and wind conditions.

As previously mentioned, reference number 502 denotes the rated wind speed. The curve 900 refers to the overall loads of the turbine whereas, in this example, the water conditions are calm and thus do only marginally add to the loads. Under those conditions, the control of the wind turbine may use a high peak shaver set-point. In FIG. 9 this is shown as a peak shaver wind speed being about 98% of the rated wind speed. According to some embodiments, the control does not apply any peak shaver. In the embodiment of FIG. 9, however, a soft peak shaver is illustrated resulting in the flattened section 910 around the rated wind speed.

FIG. 9 furthermore illustrates the load curve 920 referring to a situation with a high load caused by the water conditions. In particular in such a situation, the control of the wind turbine may control the wind turbine such that pitching starts well before the rated wind speed, e.g. at between 80% and 85% of the referenced parameter (e.g., the power or the wind speed) resulting in an essential flattening of the loads curve around the rated wind speed. This is illustrated by the loads curve section 930.

According to aspects described herein, the peak shaver set-point such as the peak shaver wind speed or the peak shaver power is dependent on the water conditions. Typically, at water conditions causing high load to the wind turbine, the peak shaver set-point is smaller than the peak shaver set-point at water conditions which do not cause a high load to the wind turbine.

Figure 10:
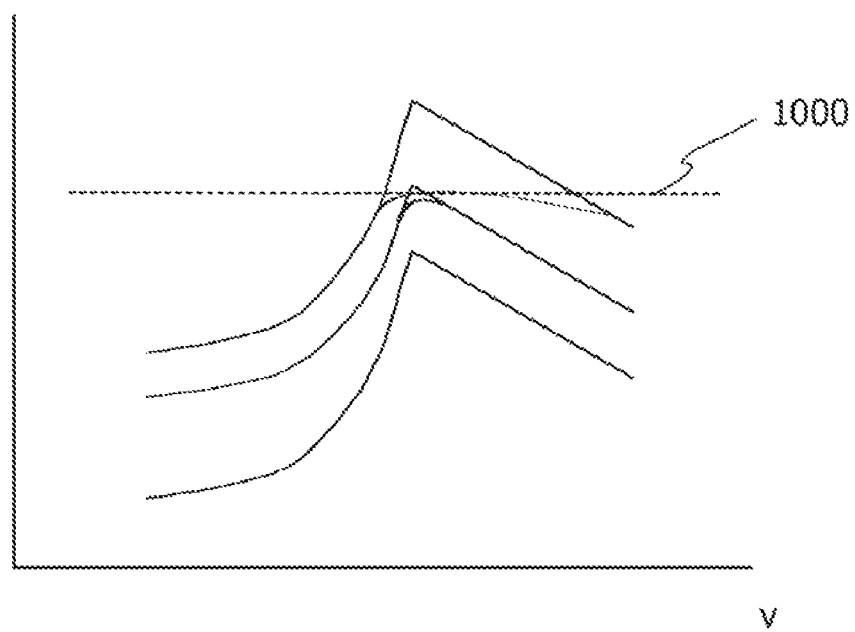
FIG. 10 shows several examples of load curves in dependence of the wind speed.

FIG. 10 shows several load curves, all having the same run, but being different from each other in the absolute amount of overall load. This figure shall illustrate an embodiment described herein wherein the wind turbine control uses the wind as peak shaver set-point. The control uses a peak shaver wind speed in dependence of the present water conditions, possibly in further view of the maximum desirable load. In case of good water conditions, no peak shaver, or a high peak shaver speed is chosen. This results in a minimum loss of energy. In case of bad water conditions and thus high loads resulting from the water conditions, the wind turbine control may select a low peak shaver wind speed so that the peak of the loads curve around the rated wind speed is essentially flattened. The control may be such that the maximum load, which is shown as a dashed line denoted by reference number 1000 in FIG. 10, is never exceeded. For illustrative purposes, the curves shown comprise both the flattened run around the rated wind speed, and the load peak as it would be present if no peak shaver control was applied.

Typical powers at which pitching starts (i.e., peak shaver power) is a maximum of 25%, more typically a maximum of 20%, and even more typically a maximum of 15% below the rated power.

If the wind speed is taken as peak shaver parameter, typical wind speeds at which pitching starts (peak shaver wind speed) are a maximum of 5 m/s, typically a maximum of 3 m/s or even more typically a maximum of 1.5 m/s below the rated wind speed. The reference to "soft peak shaver settings" herein refers to a high peak shaver wind speed, such as a maximum of 2 m/s below the rated wind speed. The reference to "strong peak shaver settings" herein refers to a low peak shaver wind speed, such as at least 2 m/s below the rated wind speed, typically at least 3 m/s below the rated wind speed.

Water conditions as understood herein may include water current speed, water current direction, water level, wave height, wave distance, wave speed, wave period, and wave type.

According to embodiments described herein, the wind turbine control selects from at least two different peak shaver settings. A first peak shaver setting is selected in case of water conditions being below a first predetermined threshold value, and a second peak shaver setting is selected in case of water conditions being above the first predetermined threshold value and below a second predetermined threshold value. It is also possible that the wind turbine control selects from at least three different peak shaver settings wherein additionally a third peak shaver setting is selected in case of third water conditions. Alternatively, the peak shaver set-point is a continuous or quasi-continuous function of at least one water condition.

Typically, the difference between the possible peak shaver settings in terms of peak shaver set-points may be a maximum of 20%, typically a maximum of 15% or even 10% of the peak shaver parameter. For instance, according to embodiments, which can be combined with other embodiments described herein, the difference between the possible peak shaver settings in terms of peak shaver wind speed may be a maximum of 3 m/s, typically a maximum of 2 m/s. In terms of power, the peak shaver set-points may vary by a maximum of 0.5 MW, more typically by a maximum of 0.2 MW.

The peak shaver settings may particularly include the peak shaver wind speed defining the start of pitching of the rotor blades. The peak shaver settings may include rules about the pitching manner such as maximum pitching angles in dependence of the wind speed and/or the generated power. For instance, such a rule could prescribe that the pitching angle shall not exceed 10° at wind speeds or power below the rated wind speed or rated power, respectively. Thereby it is possible to avoid high energy loss due to exaggerated pitching.

It is further possible that the peak shaver settings may include a maximum load threshold value which shall not be exceeded. In case the maximum load threshold would be exceeded, the wind turbine control increases the pitching angles towards a feathering position thereby reducing the wind load to the wind turbine.

The load may be measured directly by, for instance, measuring the deflection of the tower. For instance, the maximum deflection from the zero position can be measured thus allowing information about the load. Furthermore, in case of oscillation, the frequency of oscillation might be measured in order to be able to avoid any oscillation close to eigenfrequencies of the wind turbine tower. For instance, this maximum load threshold value could be a maximum deflection of the tower, e.g., as measured at nacelle height.

According to embodiments, the peak shaver settings are set in dependence on the measurement results. The measurement results may include one or more of water current speed, water current direction, water level, wave speed, wave height, wave distance, wave period and wave frequency. For instance, at measured values below predetermined peak shaver set-points, the peak shaver settings may be set approximately to zero, i.e., no peak shaver. At measured values above predetermined peak shaver set-points, the peak shaver settings may be set to higher values resulting in a control which applies pitching already prior to the rated rotational speed.

According to embodiments, the peak shaver settings are adapted to the water conditions. Thereby, energy yield is maximized at times with low loads caused by the water conditions, and loads to the wind turbine are reduced only at those times where the loads caused by the water are high. That is, instead of always applying peak shaver, or always applying peak shaver with a predetermined peak shaver set-point, peak shaver is only applied when necessary and only to the degree which is reasonable. A reasonable balance between energy yield and load reduction is thus possible.

Figure 11:
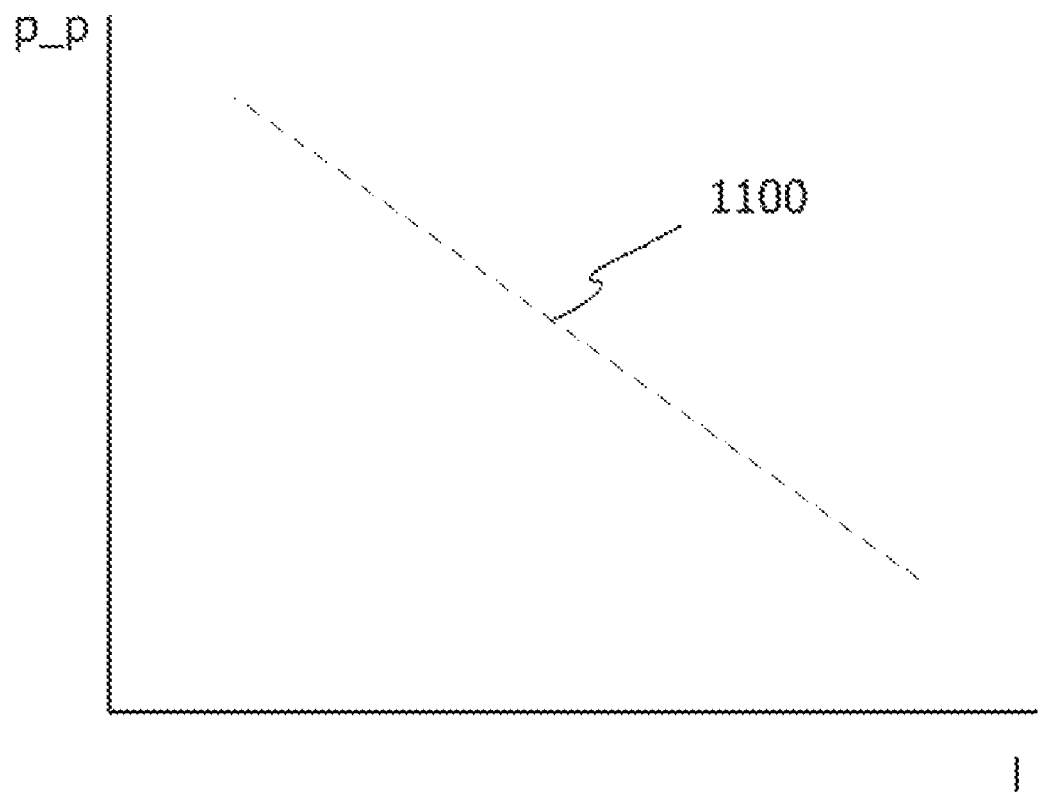
FIG. 11 shows a diagram on the peak shaver power in dependence on the water load.

An embodiment is illustrated in the diagram of FIG. 11. This diagram shows the peak shaver power p_p in dependence of the relevant water loads l. In the example shown, the water loads are a function of the water current speed v_c and the water level wl. For instance, the peak shaver power p_p may be calculated according to $$p\_p \propto 1/l \propto 1/wl * v\_c.$$

That is, the peak shaver power is indirectly proportional to the load caused by the water, wherein the load is proportional to the product of the water level and the water current speed. The exact algorithm may be stored in the wind turbine control. It typically depends on the specific wind turbine, such as its height, eigenfrequency, weight, diameter of tower and so on.

The resulting peak shaver set-point curve 1100 is shown in FIG. 11. The higher the load caused by the water, the smaller the peak shaver power is used by the wind turbine control. That is, according to those embodiments illustrated with respect to FIG. 11, the peak shaver set-point is a function of water conditions. The function may be steady so that an individual value of a peak shaver power is associated to the specific water conditions. According to other embodiments, the function may be a step function, for instance, defining two, three or more peak shaver wind speeds.

According to embodiments, the maximum reduction in overall energy capture is below 1%, typically below 0.5%. This is less than in wind turbines with a peak shaver control based on a predetermined peak shaver set-point. At the same time, peak shaver reduces the noise emission of up to 2 dB(A). Furthermore, the peak shaver control allows a gradual load characteristic with smaller load gradients and a more stable control with less risk to enter into blade stall.

According to embodiments, both terms 'influencing the control of the wind turbine in dependence of the outcome of the determining' and 'controlling the wind turbine' include maintaining a specific rotor revolution. The terms particularly include the control during the idling state of the wind turbine, i.e., during times where the wind turbine does not convert wind energy into electrical energy for supplying to an energy net (e.g., below the cut-in wind speed). For instance, below the cut-in speed, above the cut-in speed but during failure of the system, or above the cut-out speed the control may pitch the rotor blades such that a constant rotor revolution such as of 1 to 4 rotations per minute is kept. This way, in contrary to feathering the rotor blades totally, the rotor may serve as aerodynamic damping thus possibly reducing the load on the wind turbine.

According to other embodiments, the pitch angle of the rotor blades is kept constant at wind speeds above the cut-in wind speed and, at the same time, below the peak shaver set-point such as the peak shaver wind speed.

Exemplary embodiments of wind turbines and control methods are described above in detail. The wind turbines and methods are not limited to the specific embodiments described herein, but rather, components of the systems and/or steps of the methods may be utilized independently and separately from other components and/or steps described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating an off-shore wind turbine, the off-shore wind turbine being at least temporarily situated in water and comprising a rotor including at least one rotor blade and a pitch drive system coupled to the at least one rotor blade, the pitch drive system being configured to pitch the at least one rotor blade, wherein the wind turbine further comprises a wind turbine control, said method comprising:
   a) determining at least one water condition;
   b) defining peak shaver settings dependent on said at least one water condition; and
   c) pitching the at least one rotor blade according to the peak shaver settings.

2. The method according to claim 1, wherein defining peak shaver settings includes defining a peak shaver set-point, and wherein pitching the at least one rotor blade according to the peak shaver settings includes pitching when the peak shaver set-point is exceeded.

3. The method according to claim 2, wherein the wind turbine includes at least one of a rated power and a rated wind speed, and wherein the peak shaver set-point is one or more of a peak shaver power and a peak shaver wind speed, wherein the peak shaver power is smaller than the rated power of the wind turbine, and the peak shaver wind speed is smaller than the rated wind speed of the wind turbine.

4. The method according to claim 2, wherein the peak shaver set-point is defined as a function of the at least one water condition.

5. The method according to claim 2, wherein defining the peak shaver set-point selects from at least two different peak shaver wind speeds.

6. The method according to claim 2, wherein the off-shore wind turbine includes a rated value of a peak shaver parameter, wherein the peak shaver set-point is selected as being a maximum of 20% below the rated value of the peak shaver parameter.

7. The method according to claim 2, wherein the off-shore wind turbine includes a rated value of a peak shaver parameter, wherein the peak shaver set-point is selected as being a maximum of 10% below the rated value of the peak shaver parameter.

8. The method according to claim 1, wherein the water condition comprises one or more of a water current speed, a water current direction, and a water level.

9. The method according to claim 1, wherein the water condition comprises one or more of a wave height, a wave period, and a wave speed.

10. The method according to claim 1, wherein determining the at least one water condition is undertaken by means of a sensor capable of directly measuring said at least one water condition.

11. A method for operating an off-shore wind turbine, the wind turbine being at least temporarily situated in water and comprising a rotor including at least one rotor blade and a pitch drive system coupled to the at least one rotor blade, the pitch drive system being configured to pitch the at least one rotor blade, said method comprising:
   a) determining at least one of a water current speed, a water current direction and a water level at or close to the wind turbine; and
   b) controlling the wind turbine dependent on said at least one of the water current speed, the water current direction and the water level,
   wherein the off-shore wind turbine includes a rated value of a peak shaver parameter, and
   wherein controlling the wind turbine comprises
      defining a peak shaver set-point; and
      pitching the at least one rotor blade at times below the rated value of the peak shaver parameter and above the peak shaver set-point.

12. The method according to claim 11, wherein the peak shaver set-point is defined as a function of at least of the water current speed, the water current direction and the water level.

13. The method according to claim 11, wherein defining the peak shaver set-point selects from at least two different peak shaver wind speeds.

14. The method according to claim 11, wherein the peak shaver set-point is selected as being a maximum of 20% below the rated value of the peak shaver parameter.

15. The method according to claim 11, further comprising determining one or more of a wave height, a wave period, and a wave speed, wherein controlling the wind turbine is additionally made dependent on the wave height, the wave distance, and the wave speed.

16. The method according to claim 15, wherein determining is undertaken by means of a sensor capable of directly measuring one or more of the water current speed, the water current direction, the water level, the wave height, the wave period, and the wave speed.

17. The method according to claim 11, wherein controlling the wind turbine comprises pitching the rotor blades such that a constant rotor revolution of 1 to 4 rotations per minute is kept.

18. An off-shore wind turbine being situated in water, comprising:
   a) a rotor including at least one rotor blade;
   b) a pitch drive system coupled to the at least one rotor blade, the pitch drive system being configured to pitch the at least one rotor blade;
   c) a sensor configured to measure at least one of a water current speed, a water current direction and a water level at or close to the wind turbine; and
   d) a wind turbine control for controlling the wind turbine, wherein the wind turbine control controls the pitch drive system in dependence of the measured at least one of the water current speed, the water current direction and the water level,
   wherein the off-shore wind turbine includes a rated value of a peak shaver parameter, and
   wherein the wind turbine control is configured to
      define a peak shaver set-point, and
      pitch the at least one rotor blade at times below the rated value of the peak shaver parameter and above the peak shaver set-point.

* * * * *